United States Patent
Hiroe et al.

(10) Patent No.: US 8,730,025 B2
(45) Date of Patent: May 20, 2014

(54) INSTRUMENT DRIVING DEVICE

(75) Inventors: Kenichiro Hiroe, Niigata (JP); Masaki Yamazoe, Niigata (JP)

(73) Assignee: Nippon Seiko Co., Ltd., Niigata (JP)

( * ) Notice: Subject to any disclaimer, the term of this patent is extended or adjusted under 35 U.S.C. 154(b) by 68 days.

(21) Appl. No.: 13/518,758

(22) PCT Filed: Dec. 14, 2010

(86) PCT No.: PCT/JP2010/072422
§ 371 (c)(1),
(2), (4) Date: Jun. 22, 2012

(87) PCT Pub. No.: WO2011/077994
PCT Pub. Date: Jun. 30, 2011

(65) Prior Publication Data
US 2012/0255483 A1    Oct. 11, 2012

(30) Foreign Application Priority Data
Dec. 23, 2009   (JP) ................................ 2009-291534

(51) Int. Cl.
*B60Q 1/00*    (2006.01)
(52) U.S. Cl.
USPC ........... 340/461; 116/288; 340/438; 340/441; 345/589
(58) Field of Classification Search
USPC ........... 340/438, 441, 461; 116/288; 345/589; 362/459
See application file for complete search history.

(56) References Cited

U.S. PATENT DOCUMENTS

| | | | |
|---|---|---|---|
| 6,441,726 B1 * | 8/2002 | Voto et al. | 340/438 |
| 6,556,134 B2 * | 4/2003 | Nakaji et al. | 340/461 |
| 8,531,283 B2 * | 9/2013 | Katayama | 340/438 |
| 2006/0232986 A1 * | 10/2006 | Miyagaki et al. | 362/459 |
| 2012/0313958 A1 * | 12/2012 | Lee et al. | 345/589 |

FOREIGN PATENT DOCUMENTS

| | | |
|---|---|---|
| JP | 2004-245755 | 9/2004 |
| JP | 2004-325324 | 11/2004 |
| JP | 2009-150851 | 7/2009 |

* cited by examiner

*Primary Examiner* — Brent Swarthout
(74) *Attorney, Agent, or Firm* — McDermott Will & Emery LLP

(57) ABSTRACT

Provided is an instrument driving device which can have improved marketability and designability by providing a new expression for a prompting operation. The instrument driving device is provided with an instrument (2) that displays vehicle information by causing a pointer to turn on a display board, and a display board lighting means (2d) for illuminating the display board. The instrument driving device is also provided with a control means (2a) for causing, in response to the input of a predetermined start signal, the instrument (2) to perform a prompting operation which is different from a normal operation, and as the prompting operation, activating at least the display board lighting means (2d), then gradually reducing the illumination such that the transition in brightness is nonlinear and the fading rate lessens over time. The predetermined start signal may be the ON or OFF of an electrical power switch.

5 Claims, 3 Drawing Sheets

INSTRUMENT DRIVING DEVICE

RELATED APPLICATIONS

This application is the U.S. National Phase under 35 U.S.C. §371 of International Application No. PCT/JP2010/072422, filed on Dec. 14, 2010, which in turn claims the benefit of Japanese Application No. 2009-291534, filed on Dec. 23, 2009 the disclosures of which Applications are incorporated by reference herein.

TECHNICAL FIELD

The present invention relates to a driving device of an instrument for indicating vehicle information by rotating a pointer on a display plate.

BACKGROUND ART

A known vehicle instrument for indicating various information on a vehicle (hereinafter referred to as vehicle information), such as vehicle speed, engine speed, water temperature and oil pressure, is, for example, a pointer indication type instrument that indicates measured quantity showing the vehicle information by rotating on a display plate a pointer coupled to a driving main body, including a combination meter containing a speed meter, a tachometer and a fuel gauge in a case body, and an additional meter, containing a single analog meter main body in a case, for monitoring the vehicle information separately from the combination meter.

Such a vehicle instrument is expected to have a novel design. A known example of such a design is to cause the vehicle instrument to perform a mood enhancement operation (non-display operation) different from displaying the vehicle information, in response to ON-input or OFF-input of a vehicle ignition switch (power switch). Examples of this mood enhancement operation include: rotating the pointer along a scale of the display plate from a zero position to a maximum position and then returning the pointer to the zero position; providing dedicated illuminating sources to the pointer and a scale plate and activating the illuminating light sources at slightly different times in response to ON of the IGN switch; and gradually changing the intensity of the illuminating light sources. Examples of such a vehicle instrument are disclosed in Patent Documents 1 and 2.

RELATED ART DOCUMENTS

Patent Documents

Patent Document 1: JP-A-2004-245755
Patent Document 2: JP-A-2004-325324

SUMMARY OF THE INVENTION

Problems to be Solved by the Invention

However, the mood enhancement operation is always expected to be novel, so the way of expression using an illuminating means needs to be further improved.

In view of the above-described problem, it is an object of the present invention to provide an instrument driving device that can provide a novel expression of a mood enhancement operation and improve merchantability and design.

Means for Solving the Problems

The present invention provides an instrument driving device including: an instrument for showing vehicle information by rotating a pointer on a display plate; and a display plate illuminating means for illuminating the display plate, wherein the instrument driving device further includes a control means that causes the instrument to perform a mood enhancement operation different from a normal displaying operation in response to an input of a predetermined start signal, and, as part of the mood enhancement operation, at least activates the display plate illuminating means and then gradually reduces the intensity of the display plate illuminating means to non-lighted state so that the intensity changes non-linearly and the light reduction rate decreases with time.

Furthermore, the instrument driving device includes a pointer illuminating means for illuminating the pointer, wherein, as part of the mood enhancement operation, the control means activates the pointer illuminating means, and then activates the display plate illuminating means.

Furthermore, the instrument driving device includes a light emitting section illuminating means, provided in the instrument, for illuminating a light emitting section having an area smaller than that of the display plate, wherein, as part of the mood enhancement operation, the control means activates the light emitting section illuminating means before activating the display plate illuminating means, and then gradually reduces the intensity of the light emitting section illuminating means to non-lighted state so that the intensity changes non-linearly and the light reduction rate decreases with time.

Furthermore, the instrument driving device includes the plural light emitting section illuminating means, wherein, as part of the mood enhancement operation, after the display plate illuminating means becomes in non-lighted state, the control means individually causes the plural light emitting section illuminating mean to blink so that they are activated alternately with each other.

Furthermore, as part of the mood enhancement operation, the control means rotates the pointer as the intensity of the display plate illuminating means is gradually reduced.

Furthermore, the start signal is ON-input or OFF-input from a power supply switch.

Furthermore, the instrument driving device includes: a first control means, as part of the control means, for transmitting a mood enhancement operation data in the form of serial data in response to an input of the start signal; and a second control means, as part of the control means, for receiving the serial data and causing the instrument to perform the mood enhancement operation in response to the serial data.

Advantage of the Invention

The invention relates to an instrument driving device for showing vehicle information by rotating a pointer on a display plate, which can provide a novel expression of a mood enhancement operation and improve merchantability and design.

MODE FOR CARRYING OUT THE INVENTION

Figure 1:
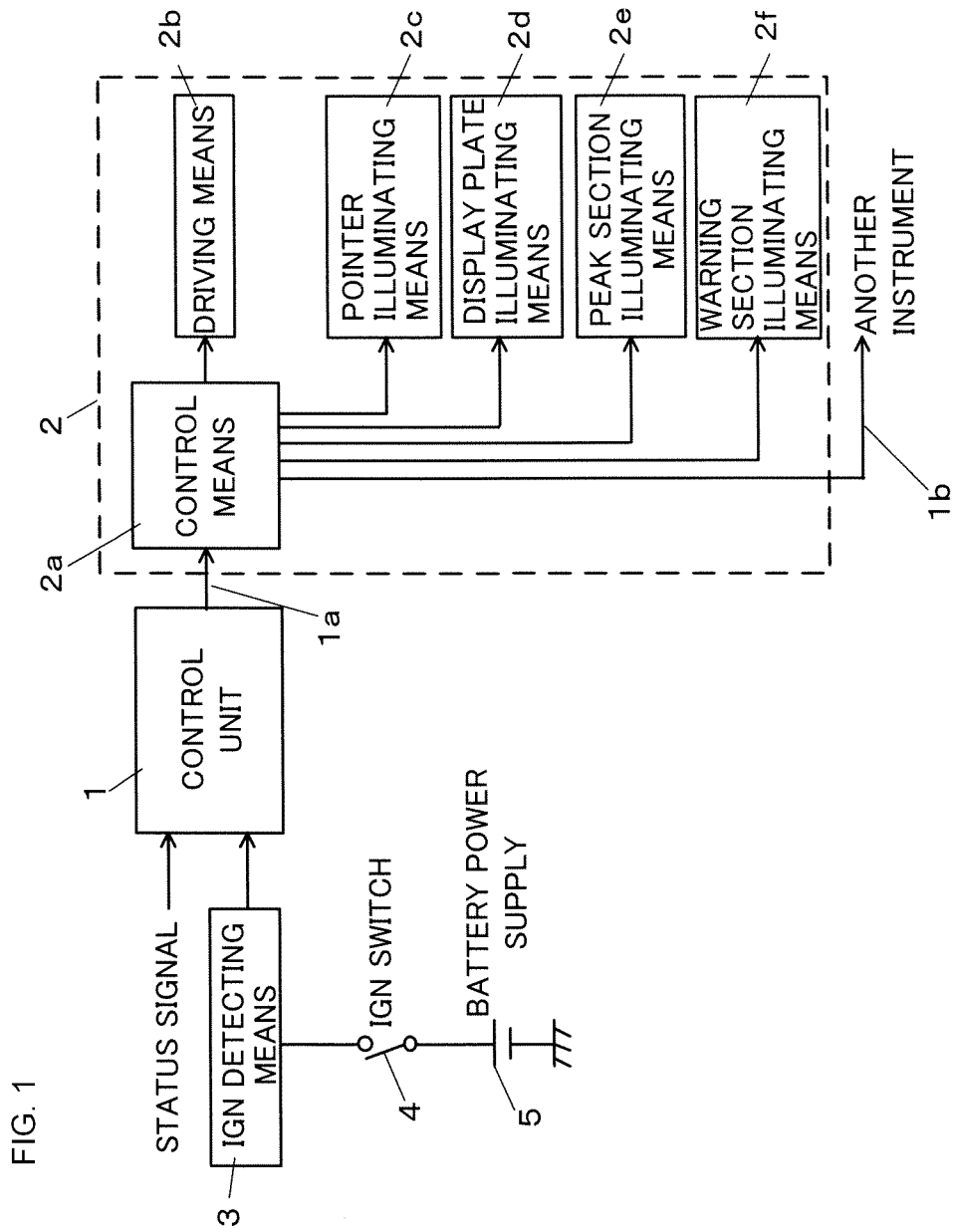
FIG. 1 is a diagram showing an electrical configuration of an instrument driving device in accordance with an embodiment of the invention.

An instrument driving device in accordance with an embodiment of the invention in which it is contemplated that plural vehicle instruments are provided is described below with reference to the accompanying drawings. An entire configuration of the instrument driving device is described with reference to FIGS. 1 and 2. As shown in FIG. 1, the instrument driving device generally includes a control unit (a first control means) 1, an analog meter (an instrument) 2 and an IGN (ignition) detecting means 3.

The control unit 1, including a microcomputer, includes: an A/D converter to which respective status signals indicating vehicle information are to be input; a CPU for executing a predetermined processing program; a ROM for storing the processing program and the like; a RAM for temporarily storing data and the like having been processed by the CPU; a parallel-to-serial converter (P/S converter) for converting parallel data to serial data; a storage, including an EEPROM, a backup RAM and the like, for storing various settings in a nonvolatile manner; and a transmitter for transmitting the serial data with a predetermined period. On receiving the respective status signals indicating the vehicle information, the control unit 1 performs a predetermined calculation in response to the respective status signals to determine each measured data of the vehicle information. In normal operation mode, the control unit 1 converts parallel data, including a model code that identifies a model of the instrument and the each measured data, into serial data, and transmits the serial data to a control means 2a, described later, of the analog meter 2 through a wiring member 1a. Furthermore, on receiving a detection signal of ON of an IGN switch 4 from the IGN detecting means 3 as a predetermined start signal, the control unit 1 transmits to the control means 2a in the form of serial data initial operation data (mood enhancement operation data) for causing the analog meter 2 to perform an initial operation (mood enhancement operation) different from a normal operation of displaying the vehicle information.

Figure 2:
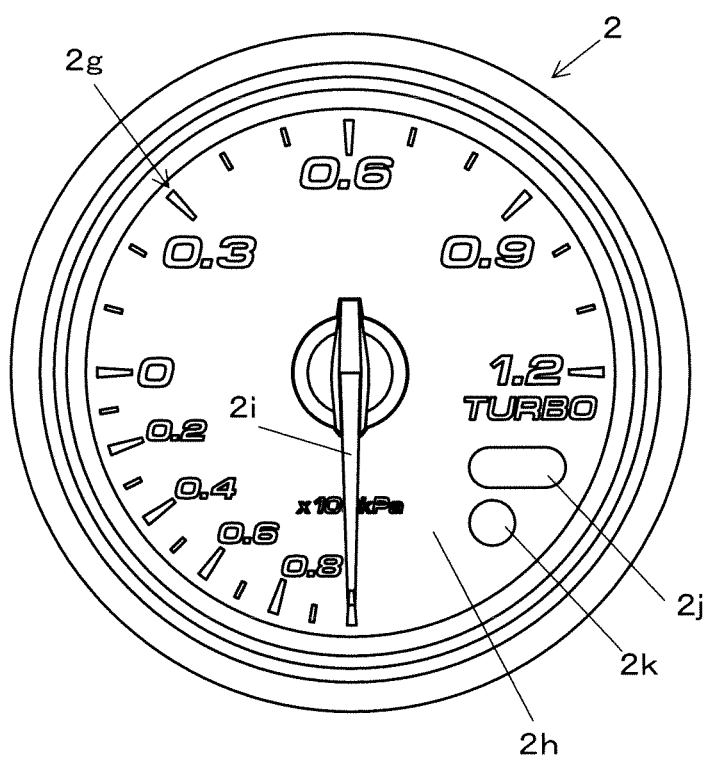
FIG. 2 is an illustration showing an analog meter of the instrument driving device.

The analog meter 2 is an analog-type vehicle instrument that includes a control means (a second control means) 2a, a driving means 2b, a pointer illuminating means 2c, a display plate illuminating means 2d, a peak section illuminating means (display section illuminating means) 2e and a warning section illuminating means (display section illuminating means) 2f, and further includes a display plate 2h on which a scale 2g for vehicle information is formed by printing and a pointer 2i for pointing the scale 2g. On the display plate 2h, a peak section 2j and a warning section 2k are formed by printing. The peak section 2j emits light when the vehicle information reaches a peak value. The warning section 2k emits light when the vehicle information reaches a predetermined warning value. Note that FIG. 2 shows an appearance of the analog meter 2 that is a manifold pressure gage (turbo meter).

The control means 2a, including a microcomputer, receives the serial data transmitted by the control unit 1 and, based on the serial data, controls the driving means 2b, the pointer illuminating means 2c, the display plate illuminating means 2d, the peak section illuminating means 2e and the warning section illuminating means 2f. Note that the control means 2a includes a connection section capable of connecting with another instrument through a wiring member 1b. Through the connection section, plural vehicle instruments can connect to and communicate with one another using the serial data. Furthermore, the control means 2a can perform the initial operation, described later, by controlling the driving means 2b, the pointer illuminating means 2c, the display plate illuminating means 2d, the peak section illuminating means 2e and the warning section illuminating means 2f in response to the initial operation data received in the form of the serial data.

The driving means 2b, including a stepping motor for performing step angle operation, rotates the pointer 2i through a rotation shaft (not shown) to point the scale 2g. A user can see a change in a measured value of the vehicle information by monitoring the pointer 2i with respect to the scale 2g.

The pointer illuminating means 2c, for example, including a light emitting device such as LED provided behind the pointer 2i, illuminates a portion pointed by the pointer 2i with its illuminating light.

The display plate illuminating means 2d, for example, including a light emitting device such as LED provided behind the scale 2g, transparently illuminates the scale 2g of the display plate 2h with its illuminating light.

The peak section illuminating means 2e, for example, including a light emitting device such as LED provided behind the peak section 2j, works as a light source for causing the peak section 2j to emit light.

The warning section illuminating means 2f, for example, including a light emitting device such as LED provided behind the warning section 2k, works as a light source for causing the warning section 2k to emit light.

The IGN detecting means 3 detects a transition from OFF-state to ON state and a transition from ON-state to OFF state of the IGN switch 4 of the vehicle. When detecting ON-state or OFF-state of the IGN switch 4, the IGN detecting means 3 provides a corresponding detection signal to the control unit 1. Note that ON-state of the IGN switch 4 may be any of the following states: a transition from OFF-state of the IGN switch 4 to ON-state of an accessory power supply; a transition from OFF-state of the IGN switch 4 to ON-state of an engine start; and a transition from ON-state of the accessory power supply to ON-state of the engine start. Note that the IGN switch 4 has one end connected to a battery power supply 5 of the vehicle and the other end connected to the IGN detecting means 3.

The above-described components form the instrument driving device.

Next, the initial operation of the control unit 1 and the control means 2a of the instrument driving device is described with reference to FIG. 3. Note that, in the analog meter 2, the pointer 2i can rotate by an angle from 0° to 270° and has an origin position at the minimum scale position.

On detecting ON-state of the IGN switch 4 (ON-input) through the IGN detecting means 3 as the start signal, the control unit 1 transmits the initial operation data in the form of the serial data. In response to the received initial operation data, the control means 2a provides driving signals to the driving means 2b, the pointer illuminating means 2c, the display plate illuminating means 2d, the peak section illuminating means 2e and the warning section illuminating means 2f to cause them to perform the initial operation.

Figure 3:
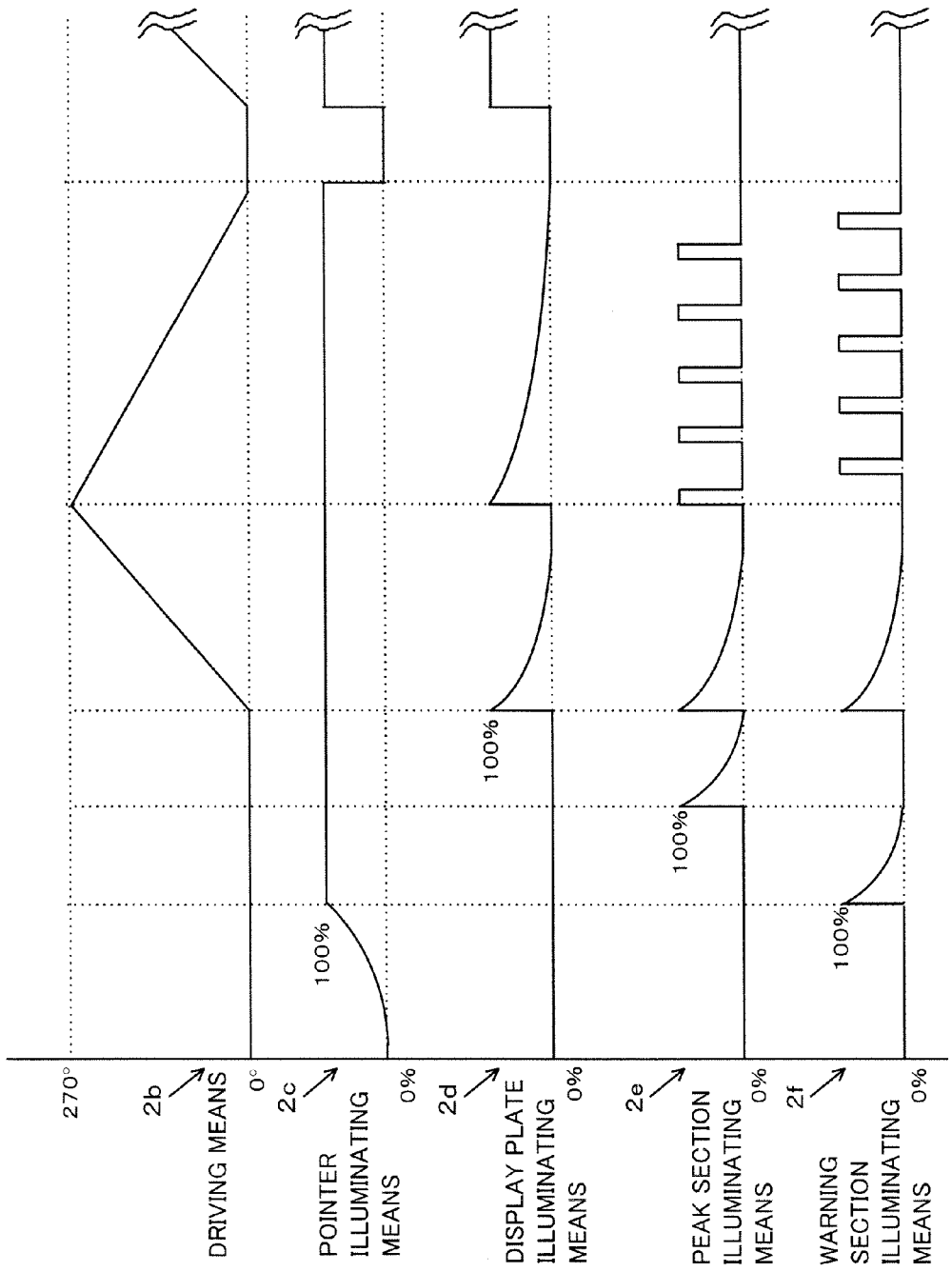
FIG. 3 is a chart showing a processing method of a control means of the instrument driving device.

FIG. 3 is a timing chart showing a method for controlling the driving means 2b, the pointer illuminating means 2c, the display plate illuminating means 2d, the peak section illuminating means 2e and the warning section illuminating means 2f in the initial operation.

In the initial operation, first, the control means 2a gradually activates the pointer illuminating means 2c for illuminating the pointer 2i from non-lighted state (0% intensity) to fully-lighted state (intensity: 100%). Next, the control means 2a activates with maximum intensity the warning section illuminating means 2f for causing the warning section 2k to emit light, then gradually reduces the intensity to non-lighted state so that the intensity changes non-linearly and the light reduction rate decreases with time. Specifically, the intensity of the warning section illuminating means 2f is gradually reduced so that the intensity changes according to a quadratic curve satisfying $y=ax^2$ (a: constant) where y is the light-emitting intensity and x is the remaining time before non-lighted state. Note that a cubic curve or the like may also be used as a non-linear change.

Furthermore, after the warning section illuminating means 2*f* becomes in non-lighted state, the control means 2*a* activates with maximum intensity the peak section illuminating means 2*e* for causing the peak section 2*j* to emit light, then gradually reduces the intensity to non-lighted state so that the intensity changes non-linearly and the light reduction rate decreases with time. Specifically, the intensity of the peak section illuminating means 2*e* is gradually reduced so that the intensity changes according to a quadratic curve satisfying $y=ax^2$ (a: constant) where y is the light-emitting intensity and x is the remaining time before non-lighted state. Note that a cubic curve or the like may also be used as a non-linear change.

Furthermore, after the peak section illuminating means 2*e* becomes in non-lighted state, the control means 2*a* activates with maximum intensity the display plate illuminating means 2*d* for illuminating the scale 2*g*, then gradually reduces the intensity to non-lighted state so that the intensity changes non-linearly and the light reduction rate decreases with time. Specifically, the intensity of the display plate illuminating means 2*d* is gradually reduced so that the intensity changes according to a quadratic curve satisfying $y=ax^2$ (a: constant) where y is the light-emitting intensity and x is the remaining time before non-lighted state. Note that a cubic curve or the like may also be used as a non-linear change. Furthermore, the control means 2*a* provides a driving signal to the driving means 2*b*, causing the driving means 2*b* to start rotating the pointer 2*i* coupled to the driving means 2*b* from the minimum scale position (pointing angle: 0°) toward the maximum scale position of the scale 2*g* simultaneously with the activation of the display plate illuminating means 2*d* and rotate the pointer 2*i* to the maximum scale position (pointing angle: 270°) as the intensity of the display plate illuminating means 2*d* is gradually reduced. Furthermore, the control means 2*a* also activates the peak section illuminating means 2*e* and the warning section illuminating means 2*f* with maximum intensity simultaneously with the activation of the display plate illuminating means 2*d*, then gradually reduces the intensity to non-lighted state so that the intensity changes according to a quadratic curve.

Furthermore, after the display plate illuminating means 2*d*, the peak section illuminating means 2*e* and the warning section illuminating means 2*f* become in non-lighted state, the control means 2*a* individually causes the peak section illuminating means 2*e* and the warning section illuminating means 2*f* to blink so that they are activated alternately with each other. Furthermore, the control means 2*a* starts rotating the pointer 2*i* from the maximum scale position toward the minimum scale position of the scale 2*g* simultaneously with the start of the blinking of the peak section illuminating means 2*e* and rotates the pointer 2*i* to the minimum scale position while the peak section illuminating means 2*e* and the warning section illuminating means 2*f* are blinking. Furthermore, the control means 2*a* activates the display plate illuminating means 2*d* with maximum intensity again, simultaneously with the first activation of the peak section illuminating means 2*e*, then gradually reduces the intensity to non-lighted state so that the intensity changes according to a quadratic curve.

Finally, when the display plate illuminating means 2*d* becomes in non-lighted state and the pointer 2*i* reaches the minimum scale position, the control means 2*a* causes the pointer illuminating means 2*c* to be in non-lighted state to finish the initial operation, then proceeds to the normal operation of displaying the vehicle information.

The above-described processing performed by the control unit 1 and the control means 2*a* enables the instrument driving device to achieve a novel mood enhancement operation in the initial operation which depicts fireworks continuously shot in the night sky. Specifically, in the first stage, the pointer 2*i* is caused to emit light, depicting a ray of light when a firework is shot. Then, in the second stage, the warning section 2*k* and the peak section 2*j*, having a small light emitting area, are caused to emit light, depicting small mood-enhancing fireworks when fireworks are continuously shot. At this time, the intensity of the warning section illuminating means 2*f* and the peak section illuminating means 2*e* is gradually reduced so that the intensity changes non-linearly and the light reduction rate decreases with time, which can depict the fireworks exploding and then disappearing in the afterglow. Then, in the third stage, the scale 2*g*, having the largest light-emitting area in the analog meter 2, is caused to emit light, depicting a large firework as a climax of continuous fireworks shooting. At this time, the intensity of the display plate illuminating means 2*d* is gradually reduced so that the intensity changes non-linearly and the light reduction rate decreases with time, which can depict the firework exploding and then disappearing in the afterglow. Furthermore, in the third stage, the pointer 2*i* is rotated to the maximum scale position as the intensity of the display plate illuminating means 2*d* is gradually reduced, which can provide more gorgeous mood enhancement. Note that, in the embodiment, in order to achieve a further mood-enhancing effect of shooting small mood-enhancing fireworks simultaneously with the large firework, the activation and intensity reduction of the peak section illuminating means 2*e* and the warning section illuminating means 2*f* is performed also in the third stage. Then, in the fourth stage, the peak section 2*j* and the warning section 2*k* are caused to blink so that they are activated alternately with each other, depicting the afterglow scattering and disappearing after the explosion of the fireworks. Furthermore, in the fourth stage, the pointer 2*i* is rotated to the minimum scale position while the peak section illuminating means 2*e* and the warning section illuminating means 2*f* are blinking, which can depict the after glow when the fireworks are disappearing. Note that, in the embodiment, in order to achieve a further mood-enhancing effect of continuously shooting large fireworks, the activation and intensity reduction of the display plate illuminating means 2*d* is performed also in the fourth stage. The above-described mood enhancement operation makes a user think of fireworks shooting, which provides a novel illumination effect that is different from a simple intensity change or instantaneous switching of illumination color.

Note that, in the mood enhancement operation of the embodiment, when the pointer 2*i* is rotated by the driving means 2*b*, in order to eliminate a step-out of the driving means 2*b* (stepping motor), a step-out reset (e.g., changing acceleration and deceleration ramps, etc.) may be performed. Applying the step-out reset to the mood enhancement operation can improve the reliability of the driving means 2*b* to perform precise mood enhancement.

Note that, in the mood enhancement operation of the embodiment, a termination operation may be performed in response to OFF-input from the IGN switch 4 as a start signal. On detecting OFF-state of the IGN switch 4 (ON-input) through the IGN detecting means 3 as the start signal, the control unit 1 transmits the termination operation data in the form of the serial data. In response to the received termination operation data, the control means 2*a* provides driving signals to the driving means 2*b*, the pointer illuminating means 2*c*, the display plate illuminating means 2*d*, the peak section illuminating means 2*e* and the warning section illuminating means 2*f* to cause them to perform the termination operation. For example, in the embodiment, the termination operation may be performed by rotating the pointer 2*i* from a current pointing position indicating the vehicle information to the minimum scale position of the scale 2*g*, then causing the pointer illuminating means 2*c*, the display plate illuminating means 2*d*, the peak section illuminating means 2*e* and the warning section illuminating means 2*f* to be in non-lighted state, and then performing a control method shown in FIG. 3, which enables a novel mood enhancement operation also in the termination operation.

The invention is not intended to be limited to the above-described embodiment. For example, the invention can also be applied to a demonstration in which a rotation is performed within a predetermined range for display purpose.

INDUSTRIAL APPLICABILITY

The present invention is useful for a driving device of an instrument for indicating vehicle information by rotating a pointer on a display plate.

DESCRIPTION OF REFERENCE NUMERALS AND SIGNS

1 control unit (first control means)
2 analog meter (instrument)
2*a* control means (second control means)
2*b* driving means
2*c* pointer illuminating means
2*d* display plate illuminating means
2*e* peak section illuminating means (light-emitting section illuminating means)
2*f* warning section illuminating means (light-emitting section illuminating means)
2*g* scale
2*h* display plate
2*i* pointer
2*j* peak section
2*k* warning section
3 IGN detecting means

The invention claimed is:

1. An instrument driving device comprising:
 an instrument for showing vehicle information by rotating a pointer on a display plate;
 a display plate illuminating means for illuminating the display plate;
 a plurality of light emitting section illuminating means, provided in the instrument, for illuminating a light emitting section having an area smaller than that of the display plate; and
 a control means that causes the instrument to perform a mood enhancement operation different from a normal displaying operation in response to an input of a predetermined start signal, and, as part of the mood enhancement operation, at least activates the display plate illuminating means and then gradually reduces the intensity of the display plate illuminating means to a non-lighted state so that the intensity changes non-linearly and the light reduction rate decreases with time,
 wherein, as part of the mood enhancement operation, the control means activates at least one of the plurality of light emitting section illuminating means before activating the display plate illuminating means, and then gradually reduces the intensity of the at least one of the plurality of light emitting section illuminating means to a non-lighted state so that the intensity changes non-linearly and the light reduction rate decreases with time, and
 after the display plate illuminating means becomes the non-lighted state, the control means individually causes the plurality of light emitting section illuminating means to blink so that the plurality of light emitting section illuminating means are activated alternately with each other.

2. The instrument driving device according to claim 1, further comprising a pointer illuminating means for illuminating the pointer,
 wherein, as part of the mood enhancement operation, the control means activates the pointer illuminating means, and then activates the display plate illuminating means.

3. The instrument driving device according to claim 1, wherein, as part of the mood enhancement operation, the control means rotates the pointer as the intensity of the display plate illuminating means is gradually reduced.

4. The instrument driving device according to claim 1, wherein the start signal is ON-input or OFF-input from a power supply switch.

5. The instrument driving device according to claim 1, further comprising:
 a first control means, as part of the control means, for transmitting a mood enhancement operation data in the form of serial data in response to an input of the start signal; and
 a second control means, as part of the control means, for receiving the serial data and causing the instrument to perform the mood enhancement operation in response to the serial data.

\* \* \* \* \*

UNITED STATES PATENT AND TRADEMARK OFFICE
CERTIFICATE OF CORRECTION

PATENT NO. : 8,730,025 B2
APPLICATION NO. : 13/518758
DATED : May 20, 2014
INVENTOR(S) : Kenichiro Hiroe et al.

It is certified that error appears in the above-identified patent and that said Letters Patent is hereby corrected as shown below:

TITLE PAGE:
ITEM 73 should read:
Assignee:    Nippon Seiki Co., Ltd., Niigata (JP)

Signed and Sealed this
Eleventh Day of November, 2014

Michelle K. Lee
*Deputy Director of the United States Patent and Trademark Office*